United States Patent
Mader et al.

(10) Patent No.: US 9,830,942 B1
(45) Date of Patent: Nov. 28, 2017

(54) OBTAINING A PREDETERMINED PHASE SHIFT IN DATA USING DIFFERENT WRITE PRECOMPENSATION ASSOCIATED WITH DIFFERENT NRZI PATTERNS

(71) Applicant: Seagate Technology LLC, Cupertino, CA (US)

(72) Inventors: Drew Michael Mader, Minneapolis, MN (US); Jason Charles Jury, Apple Valley, MN (US); Tim Rausch, Farmington, MN (US); Raman Venkataramani, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/233,298

(22) Filed: Aug. 10, 2016

(51) Int. Cl.
| | |
|---|---|
| G11B 11/00 | (2006.01) |
| G11B 20/10 | (2006.01) |
| G11B 5/00 | (2006.01) |
| G11B 20/14 | (2006.01) |

(52) U.S. Cl.
CPC .. G11B 20/10481 (2013.01); *G11B 20/10009* (2013.01); *G11B 20/1407* (2013.01); *G11B 20/1426* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,493,454 A | 2/1996 | Ziperovich et al. | |
| 6,208,477 B1 * | 3/2001 | Cloke | G11B 20/10009 360/25 |
| 6,288,858 B1 * | 9/2001 | Arnett | G11B 20/10009 360/45 |
| 6,288,859 B1 * | 9/2001 | Bergmans | G11B 20/10009 360/45 |
| 6,337,778 B1 | 1/2002 | Gagne | |
| 7,583,459 B1 * | 9/2009 | Cheng | G11B 5/09 327/165 |
| 2002/0159176 A1 * | 10/2002 | Elliott | G11B 5/012 360/46 |
| 2003/0189778 A1 | 10/2003 | Elliott et al. | |

* cited by examiner

*Primary Examiner* — Tan X Dinh
(74) *Attorney, Agent, or Firm* — Hollingsworth Davis, LLC (57) ABSTRACT

First and second different write precompensation values are associated with different first and second non-return-to-zero, inverted (NRZI) data patterns. The first and second different write precompensation values cause a predetermined phase shift to be written into test data that comprises the first and second NRZI data patterns. The test data is mitten to a recording medium of a storage device using the first and second write precompensation value. The test data is used to determine a response of the storage device to the predetermined phase shift.

18 Claims, 7 Drawing Sheets

Segment A 700
| Transition #: | NRZ | (NRZI) |
|---|---|---|
| t1: | 00001 | (000<u>1</u>) |
| t2: | 00110 | (010<u>1</u>) |
| t3: | 11001 | (010<u>1</u>) |

Segment B 702
| Transition #: | NRZ | (NRZI) |
|---|---|---|
| t4: | 01110 | (100<u>1</u>) |
| t5: | 11101 | (001<u>1</u>) |
| t6: | 11010 | (011<u>1</u>) |
| t7: | 01001 | (110<u>1</u>) |

| NRZI sequence | | | | POS | | | NEG | | |
|---|---|---|---|---|---|---|---|---|---|
| k-3 | k-2 | k-1 | k | NRZ | PAT | | NRZ | PAT | |
| 0 | 0 | 0 | 1 | 00001 | A | t1 | 11110 | B | |
| 0 | 0 | 1 | 1 | 11101 | B | t5 | 00010 | B | |
| 0 | 1 | 0 | 1 | 11001 | A | t3 | 00110 | A | t2 |
| 0 | 1 | 1 | 1 | 00101 | A | | 11010 | B | t6 |
| 1 | 0 | 0 | 1 | 10001 | A | | 01110 | B | t4 |
| 1 | 0 | 1 | 1 | 01101 | B | | 10010 | A | |
| 1 | 1 | 0 | 1 | 01001 | B | t7 | 10110 | A | |
| 1 | 1 | 1 | 1 | 10101 | A | | 01010 | B | |

FIG. 13

OBTAINING A PREDETERMINED PHASE SHIFT IN DATA USING DIFFERENT WRITE PRECOMPENSATION ASSOCIATED WITH DIFFERENT NRZI PATTERNS

SUMMARY

The present disclosure is directed to obtaining a predetermined phase shift in data using different write precompensation associated with different NRZI patterns. In one embodiment, first and second different write precompensation values are associated with different first and second non-return-to-zero, inverted (NRZI) data patterns. The first and second different write precompensation values cause a predetermined phase shift to be written into test data that comprises the first and second NRZI data patterns. The test data is written to a recording medium of a storage device using the first and second write precompensation value. The test data is used to determine a response of the storage device to the predetermined phase shift.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. These data storage devices utilize write transducers (e.g., a magnetic coil) that apply a changing magnetic field to the recording medium. The applied field changes magnetic orientation in regions of the recording medium, which define bit boundaries of the stored data. A series of adjacent bits recorded along a circular path defines a data track on the recording medium. A read transducer (e.g., magnetoresistive sensor) can later traverse the track and detect the magnetic transitions. These transitions form a signal which is decoded to recover the stored data.

Figure 1:
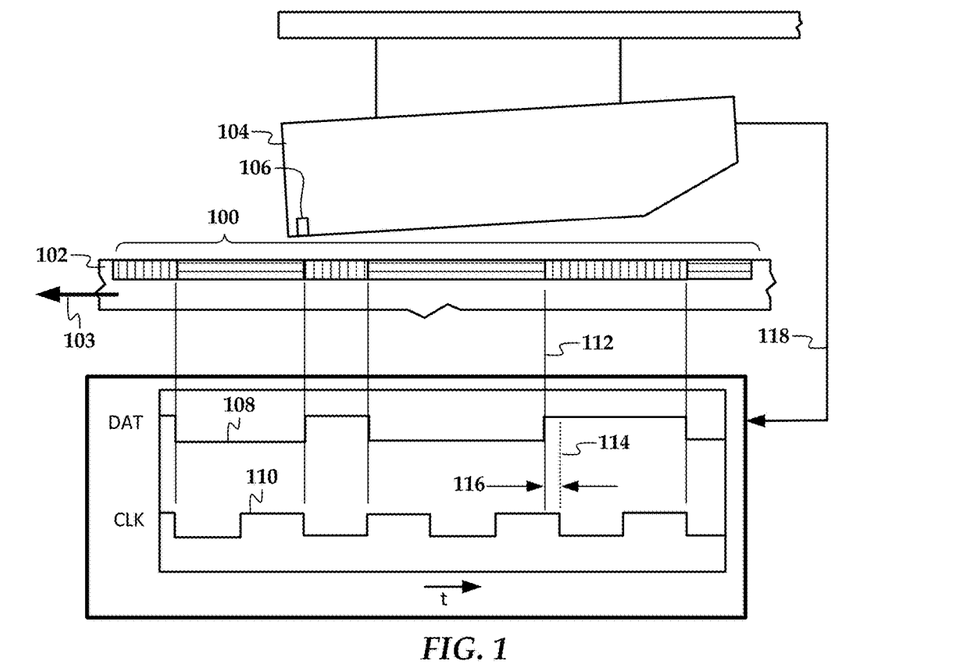
FIG. 1 is a block diagram illustrating reading of data from a recording medium according to an example embodiment.

One issue encountered when writing and reading data to and from a recording medium is variation in the placement of the magnetic transitions which can affect reading back the data. In FIG. 1, a block diagram illustrates reading data from a recording medium according to an example embodiment. Differently shaded regions 100 represent bits recorded on a magnetic disk 102. The magnetic disk 102 rotates (as indicated by arrow 103) while a read/write head 104 (also referred to as a recording head, read head, write head, slider, etc.) is held over a top surface of the disk 102.

The read/write head 104 has a transducer 106 that induces a data signal 108 in response to the changes in magnetic orientation. Each positive or negative transition of the signal 108 corresponds to a bit transition. Note that the form of signal 108 is provided for purposes of illustration, and may take other forms depending on the encoding and decoding schemes used. The bit transitions detected in signal 108 are recorded so as to correspond to a transition of a data clock signal 110. The data clock signal 110 may be implied, e.g., timing of the signal 108 may be derived based on the signal itself instead of referencing a hardware clock or other time source.

As indicated by transition 112, the recorded transitions can sometimes be offset from the data clock 110, as indicated by line 114. The physical offset of recorded transitions results in a phase offset 116 as a function of time between the signal 108 and the clock 110. It will be understood that a phase offset 116 can be caused by other factors besides or in addition to offset of written transitions, such as speed variations in the media 102, changes in clearance between the media 102 and the head 104, electrical disturbances in the channel 118, etc.

The decoding circuitry used to extract data from the signal 108 will generally include features to deal with phase offset 116 and other timing disturbances. For example, a timing recovery module can detect changes in timing and adjust decoding parameters to compensate. As the linear density of the recorded data (e.g., as measured by number of bits per track) increases, timing recovery may need to react quickly in order to deal with increased bit rate, which may result in shorter times between transitions.

Figure 2:
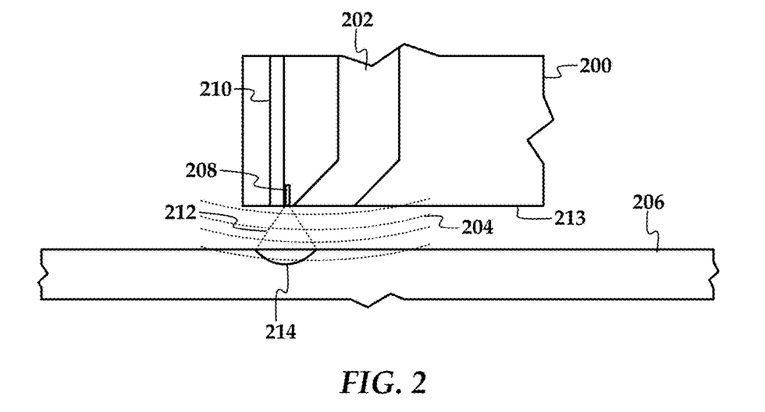
FIG. 2 is a diagram of a heat-assisted magnetic recording device according to an example embodiment.

In one type of recording, known as heat-assisted magnetic recording (HAMR), an addition source of timing error can be introduced. An example of a HAMR recording device is shown in FIG. 2. A recording head 200 includes a magnetic write pole 202 that generates a magnetic field 204 when writing to a recording medium 206. An energy source such as a laser (not shown) couples light to a near-field transducer 208 via a waveguide 210. The near-field transducer 208 achieves surface plasmon resonance when coupled to the light, directing a tightly focused energy field 212 out of media-facing surface 213 to the recording medium 206. The energy field 212 creates a hotspot 214 on the recording medium 206.

At room temperature, the recording medium 206 has high magnetic coercivity, such that a relatively high magnetic field is required to change orientation of the medium 206. This high coercivity ensures that bit recorded in small regions do not randomly change orientation, a phenomena known as the superparamagnetic effect. The hotspot 214 heats the medium to its Curie temperature, which locally lowers coercivity and enables the magnetic field 204 to change magnetic orientation at the hotspot 214 without affecting unheated surrounding areas.

As shown in FIG. 2, the hotspot 214 defines the size and the shape of the bits. Therefore the physical placement of the bit transitions depends on size and location of the hotspot 214. A number of phenomena have been found to change the size and/or relative location of the hotspot 214. For example, reflections back to the laser can result in mode-hopping, which results in dynamic variations in the amount of energy applied to the near-field transducer 208.

Other phenomena that may affect hotspot size include changes in shape of media-facing surface 213 and clearance between this surface 213 and the recording media 206. Generally, a heater (not shown) may locally heat the recording head 200 proximate read and write transducers resulting in localized protrusion at the media-facing surface 213. This protrusion can be changed by changing a current applied to the heater, thereby allowing for active control of the head-to-media clearance. The optical energy used to create the hotspot 214 can also locally heat components such as the near-field transducer 208, which alters the clearance locally due to thermal expansion. Changes in clearance can also affect the size and/or location of the hotspot 214, thereby contributing to potential timing errors in the written data.

This disclosure relates to testing of a data storage device to ensure timing errors as described above can be dealt with by decoders and other processing components of the storage device. For example, it may be useful to apply a known amount of phase shift to test patterns recorded to the medium. The ability of the read channel to read back these phase-shifted patterns can be used for qualification testing and other purposes (e.g., field testing). Further, it would be convenient to write these phase-shifted patterns without using specialized test equipment, e.g., by inducing the phase shifted patterns using functionality already present in the production device. This testing can be performed in HAMR and non-HAMR storage devices.

Figure 3:
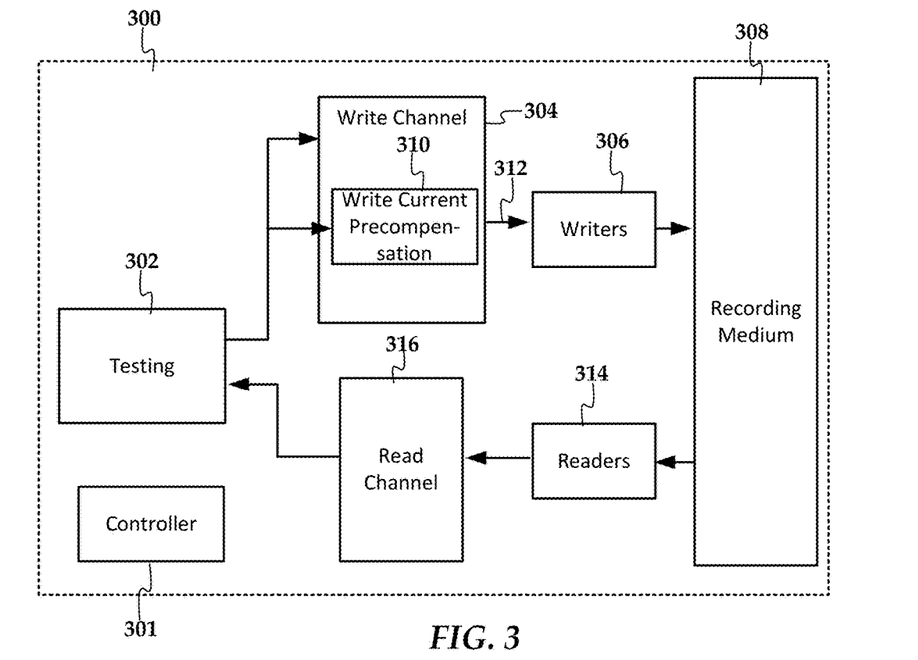
FIG. 3 is a block diagram of an apparatus according to an example embodiment.

In FIG. 3, a block diagram illustrates functional blocks used for testing a data storage device 300 according to an example embodiment. A testing module 302 includes instructions, at least some of the instructions executing on a processor/controller 301 of the data storage device 300. The testing module 302 utilizes a write channel 304 to write unique data patterns to a recording medium via one or more write transducers 306. A write current precompensation (WCP) module 310 can be used in a production device to tailor system write performance, e.g., to compensate for environmental factors that can affect timing of bit transitions. The testing module 302 can use the WCP module 310 to insert known phase shifts into signals 312 written to the recording medium 308 by giving different segments of data sectors different values of precompensation. These data patterns are read back by a read channel 316 utilizing read transducers 314, allowing the testing module 302 to determine how well the read channel (and other drive functionality) performs when reading back the phase-shifted test data.

One way in which the WCP module 310 can selectively apply phase shifts is to associated different WCP values to unique non-return-to-zero, inverted (NRZI) signal patterns. Generally, a two-level NRZI signal has a transition at a clock boundary if the bit being transmitted is a first value (e.g., a logical 1), and does not have a transition at a clock boundary if the bit being transmitted is a second value (e.g., logical 0). For magnetic data storage devices, the NRZI patterns may include run-length limited coding to ensure signal transitions occur within some maximum time to ensure clock recovery, e.g., when a long series of zeros is written.

Figure 4:
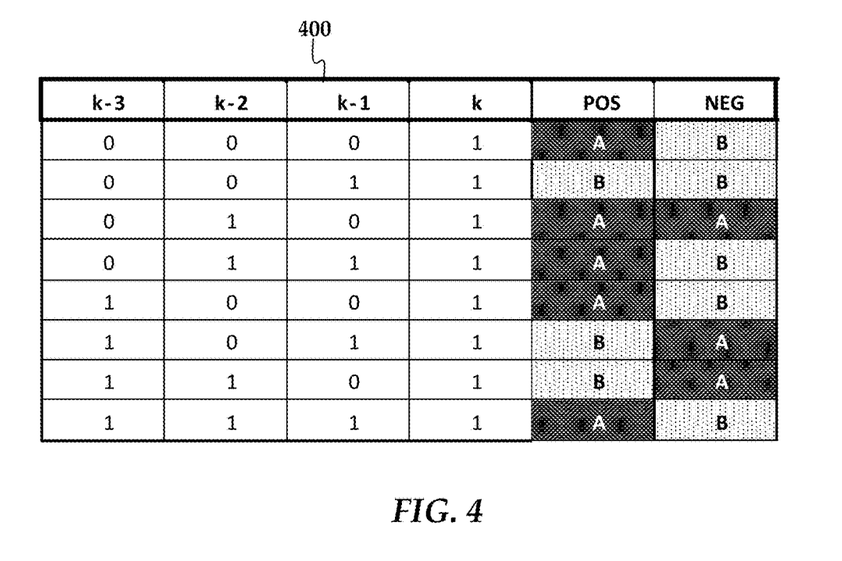
FIG. 4 is a table showing NRZI patterns that may be used to apply selective phase shifts according to an example embodiment.

The table 400 in FIG. 4 shows three-bit-look-back NRZI patterns that may be used to apply selective phase shifts according to an example embodiment. The table 400 shows the NRZI pattern of a written waveform at different times k, k−1, k−2, and k−3. In this table, time k represents the present time instant under consideration, time k−1 represents the previous time instant, etc. A value of "1" corresponds to a transition being written whereas a value of "0" indicates a lack of transition being written. There are eight unique NRZI patterns ending with a transition at present time k, as indicated by the eight rows in the table 400. The total number of patterns is 16, as different patterns will be read based on the the sign of the transition written at time k being positive or negative. This is indicated by the last two columns of table 400. These 16 unique patterns can each have their own WCP value with a specific vendor read channel.

Figure 5:
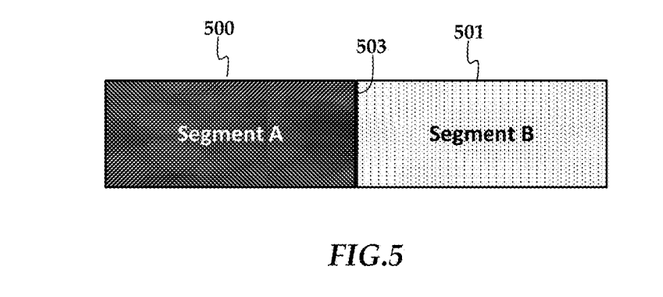
FIG. 5 is a diagram of two segments written consecutively to a storage medium according to an example embodiment.

As indicated in FIG. 4, a unique data pattern can be used having two segments, for example, called Segment A and Segment B as in the table 400. These segments will not share any of the same 16 unique NRZI patterns and therefore can be written with unique WCP values. The block diagram in FIG. 5 shows an example of a unique pattern using two segments 500, 501 written consecutively to the storage medium. The boundary 503 where the two segments 500, 501 meet is where a written phase shift can happen and thus where the testing of the channel can occur. It should be noted that the diagram in FIG. 5 is a basic example, and any number of multiple unique segments may be used. Depending on the application, there may be other constraints on which patterns and WCP values each segment may contain.

In normal operation, the WPC module 310 is used to mitigate some magnetic recording behavior that causes a systematic transition timing shift. One example is non-linear transition shift (NLTS) cancellation, where all the NRZI patterns with xx11 (in which "x" can be any value) are shifted relative to the NRZI patterns xx01. Referring to the table 400 in FIG. 4, to treat NLTS, different precompensation value would be applied to rows 2, 4, 6, and 8 relative to rows 1, 3, 5, and 7. For example, even rows could be shifted by +0.8 ns relative to odd rows, and such a WPC setup would be the default for a particular device in order to compensate for systematically-induced phase shifts. When using the above described test involving the phase shifting a pattern segment B relative to segment A to test system response, it may be desirable to keep the shifting of the default WPC setup so that the intentional phase shifts can be set to a desired level. Using this same example, if segment A had an average WPC of 5 ns and segment B had an average WPC of 0 ns, then the WPC setup to combine NLTS cancellation with intentional phase shifting would use the following set of WPC shift settings: segment A in even rows (NRZI xx11)=5.8 ns; segment A in odd rows (NRZI xx01)=5.0 ns; segment B in even rows (NRZI xx11)=0.8 ns; segment B in odd rows (NRZI xx01)=0.0 ns.

Figure 6:
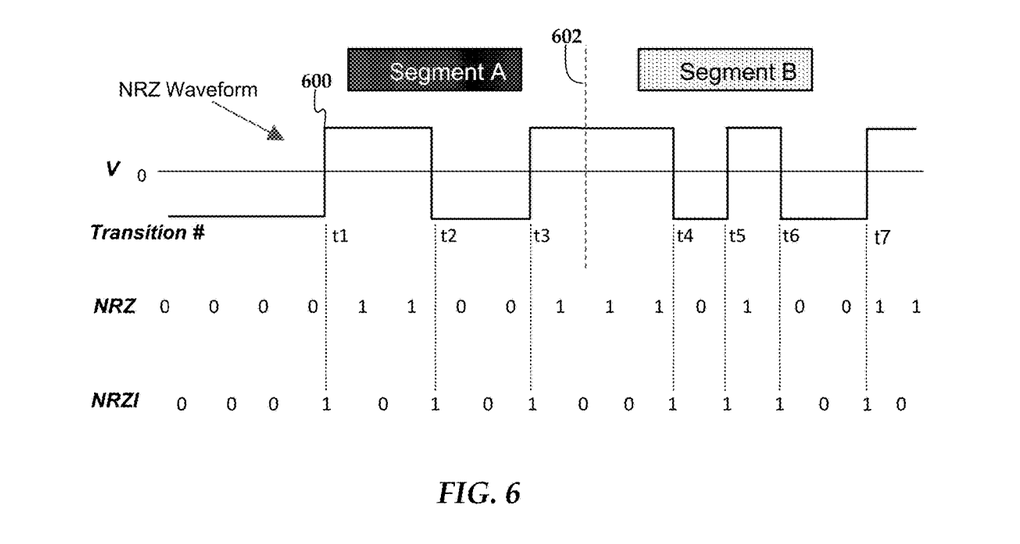
FIG. 6 is a diagram showing a signal waveform and associated data according to an example embodiment.
Figure 7:
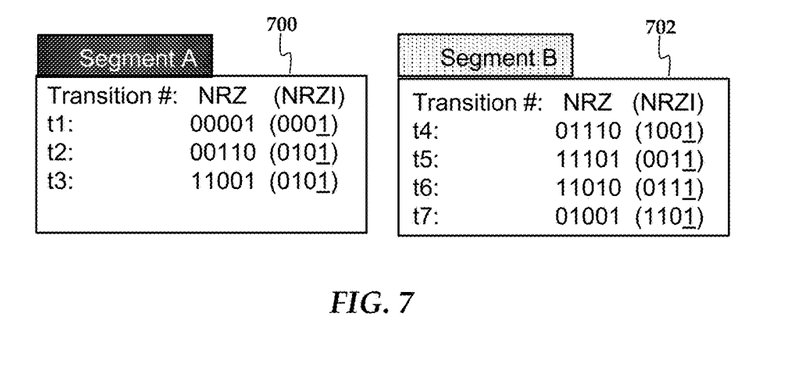
FIGS. 7 and 8 are tables showing details of the data of FIG. 6.
Figure 8:
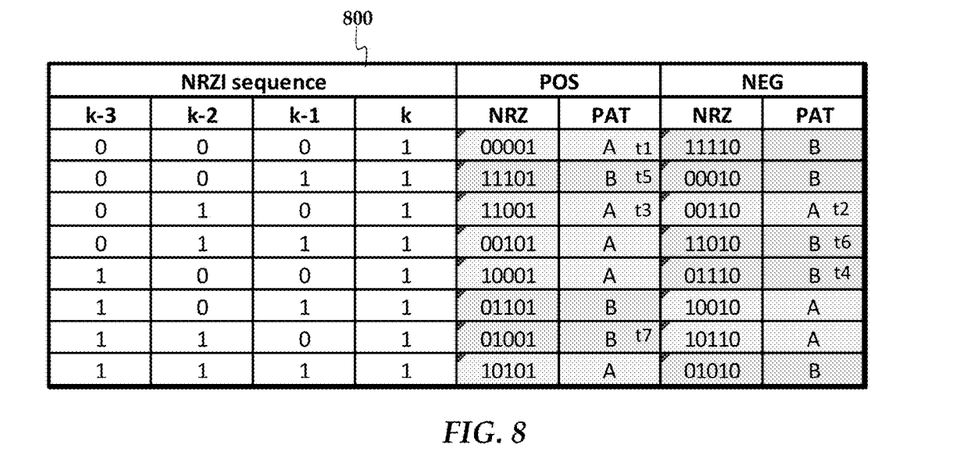

In FIGS. 6-8, diagrams show additional details of signal segments used to apply a selective phase shift according to an example embodiment. In FIG. 6, a non-return-to-zero (NRZ) signal waveform 600 is divided into Segments A and B as indicated by dividing line 602. Below the signal are the NRZ and NRZI binary values associated with the waveform 600. The bits are associated with a data clock. The transitions from t4 to t5 and from t5 to t6 are single period transitions of the data clock. The NRZ values are shown centered between two adjacent data clock transitions while the NRZI values are shown on the data clock transitions.

In some cases, "NRZ data" refers to a convention where a high signal value is represented as 1 and a low signal value is represented as −1. For ease of explanation, the low NRZ signal is represented as zero, such that "NRZ data" and "binary data" are used interchangeably in this disclosure. For example, in the NRZ representation of data in FIG. 6, a high signal (V=1) is associated with a binary 1 and a low signal (V=−1) is associated with a binary 0. The NRZI value is the difference between the current and previous NRZ value where a 1 (e.g., 1-0 or 0-1) indicates a transition occurred and 0 (e.g. 0-0 or 1-1) means a lack of a transition.

In FIG. 7, tables 700, 702 show the NRZ and NRZI values shown in FIG. 6 grouped together in respective A and B Segments. The NRZ and NRZI values in tables 700, 702 are given in time-order. For the NRZ values, this means the right-most bit is the current bit at a time k and the left-most bit is the bit at time k−4. Similarly, the right-most NRZI bit is the current NRZI data at time k, and left-most bit is the bit at time k−3. Note that each NRZI value has a 1 as the last bit, corresponding to the respective transition t1-t7 associated each of the four-bit NRZI values (the transitions t1-t7 are shown in FIG. 6). In FIG. 8, a table 800 shows the A and B NRZ patterns associated with the NRZI sequences previously shown in FIG. 4. The transitions t1-t7 of the example signal 600 in FIG. 6 are also shown in respective cells of table 800.

When different WCP values are used for first and second data segments A, B, transitions are written to the media shifted in time relative to the other transitions. Because it can be more convenient to work with transitions, the different WCP values are associated with different NRZI patterns in these examples and not with different NRZ patterns. However, it is possible to instead associate different WCP values with different NRZ patterns to achieve a similar result.

Each row in the table 800 corresponds to one of the 8 possible NRZI sequences for times (k−3, k−2, k−1, k) that have a transition at time k. Each row has two possible NRZ sequences (for times k−4, k−3, k), where "POS" refers to a positive NRZ bit at time k, and "NEG" refers to the negative NRZ bit at time k. Overall there are 16 possible NRZ sequences. A subset of these NRZ sequences are associated with segment A, and a different subset of NRZ sequences are associated with segment B. Here, 8 NRZ sequences are used for segment A, and 8 NRZ sequences are used for segment B.

In view of the division of data shown in FIG. 8, a unique binary waveform can be broken down into two segments. In such a case Segment A will have a first set of NRZI combinations and Segment B will have a second set of the NRZI combinations, there being no overlap between the first and second set. All NRZI sequences associated with Segment A can be given, for example, a WCP value of 5 ns and all NRZI combinations associated with Segment B can be given, for example, a WCP value of 0 ns. When the waveform is written, there will be a phase shift where the two segments meet caused by the difference in the timing of Segment A and Segment B (related to the 5 ns vs 0 ns).

Figure 9:
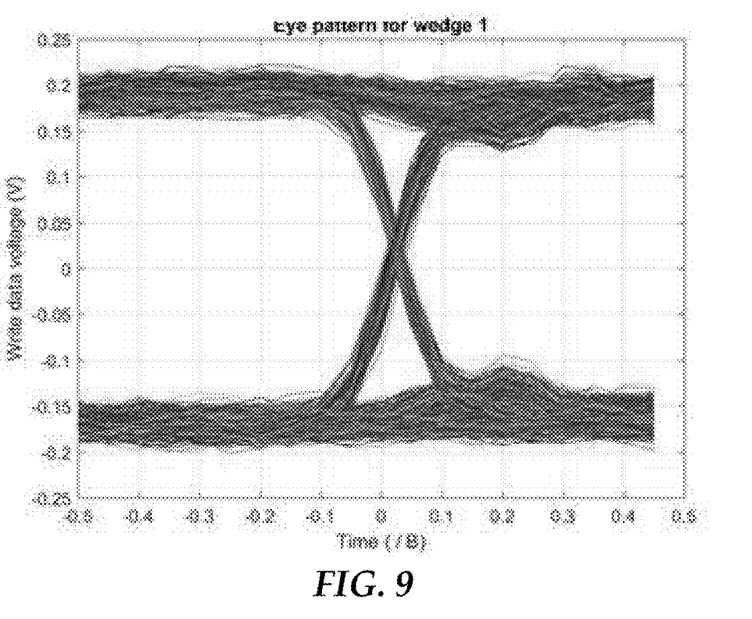
FIGS. 9-12 are graphs showing measurements of data wedge signals without and with precompensation applied according to example embodiments.
Figure 10:
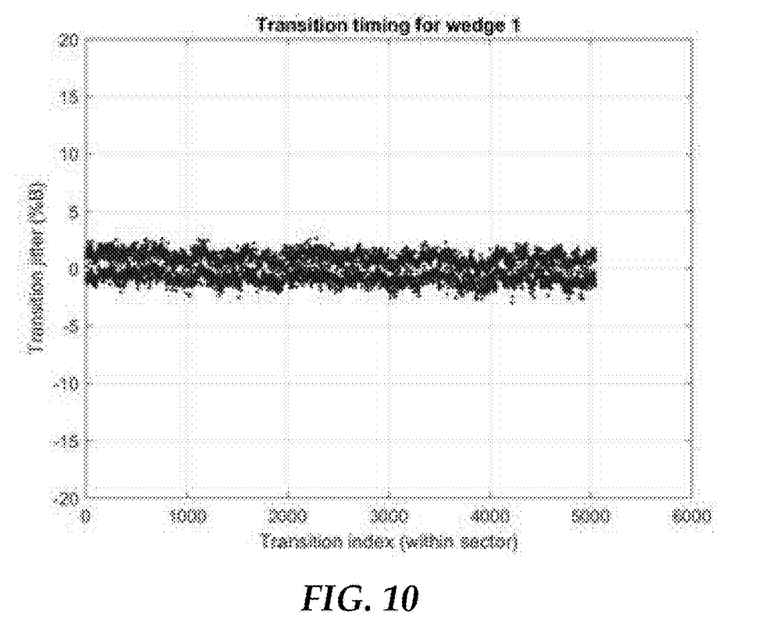
Figure 11:
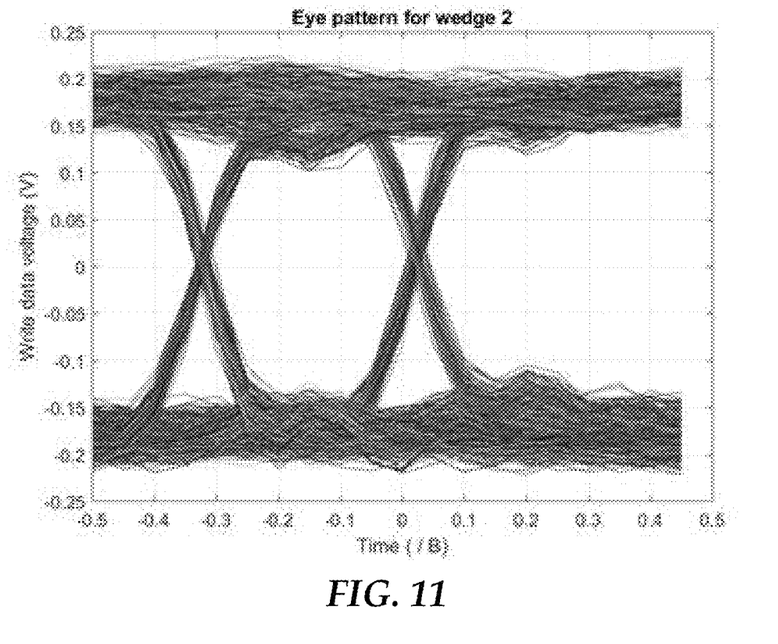
Figure 12:
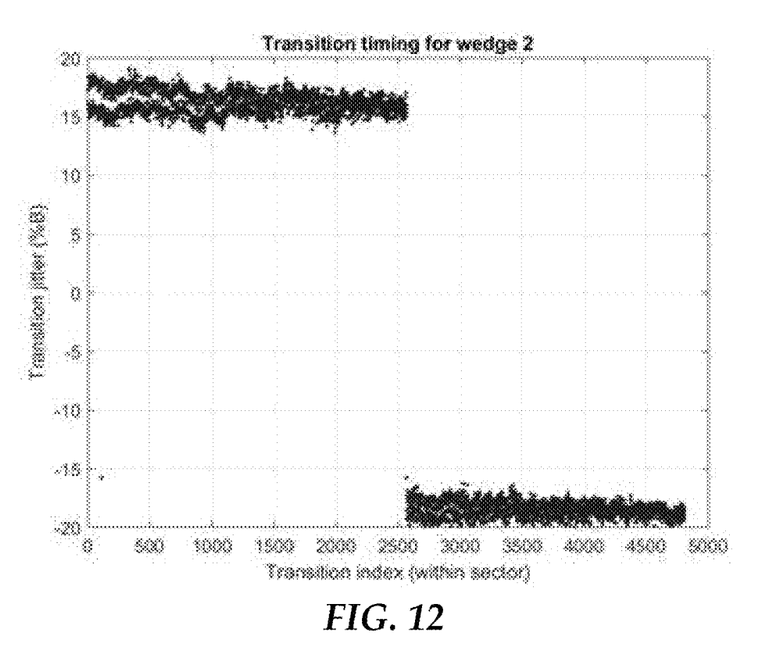

In FIGS. 9-12, graphs show measurements of data wedge signals without and with precompensation applied according to example embodiments. The example pattern shown in FIG. 9 was written to the media and the write current waveform's transitions were analyzed via an oscilloscope capture during the write. The graph in FIG. 9 shows the time each transition was written in relation to the data clock, indicated by the zero-crossings, when the written waveform was comprised solely of Segment A. The graph of FIG. 10 shows the transition jitter associated with the transitions in FIG. 9. When the write current waveform comprises both Segments A and B, with Segment B being shifted by about 30% of the bit cell, two distinct sets of relative timings and transition jitter are seen as evident in FIGS. 11 and 12. The write current waveform switches from Segment A to Segment B at about Transition Index 2550 in FIG. 12.

This example data shows that a known phase shifts can be created in known locations and therefore allows testing the channel's performance in response to large phase shifts within the data sector. One possible application where this could be used is characterizing the size of large phase shifts associated was laser mode hops in HAMR HDDs on a by-head basis in the factory process. Using other features in the channel, the phase shifts associated with the aforementioned method can be correlated with the normal phase shifts experienced by typical writes. This can be used to create a test specification with which to screen channel circuitry and allow vendors to test and improve performance due to phase shifts caused by mode hops and other laser instability.

Figure 13:
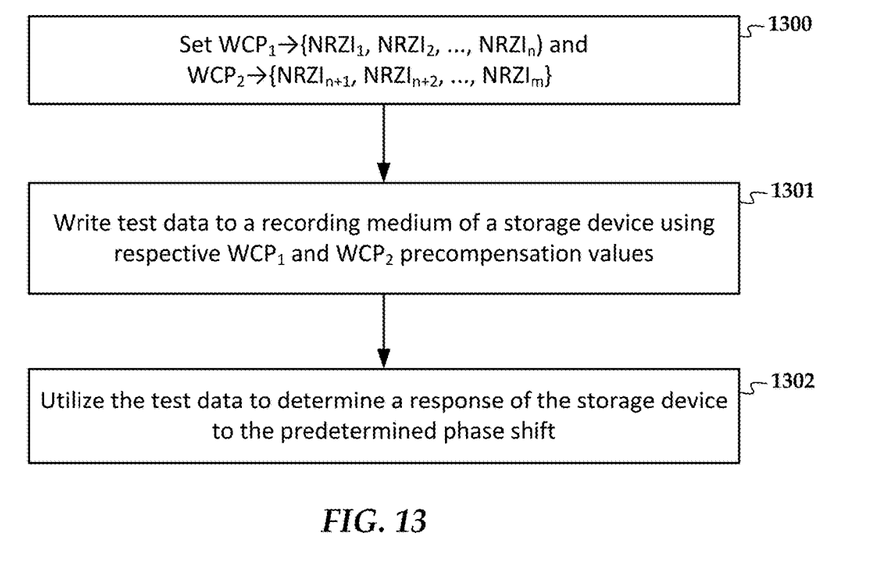
FIG. 13 is a flowchart of a method according to an example embodiment.

In FIG. 13, a flowchart shows a method according to an example embodiment. The method involves setting 1300 different first and second write precompensation values $WCP_1$, $WCP_2$ to be associated with different first and second NRZI data patterns, each of the first and second data patterns being shown as sets $S1=\{NRZI_1, NRZI_2, \ldots, NRZI_n\}$ and $S2=\{NRZI_{n+1}, NRZI_{n+2}, \ldots, NRZI_m\}$. The sets have no common NRZI data patterns ($S1 \cap S2=\{\ \}$). The sets may be of equal size (e.g., m=2n) or different sizes, and may include as few as one pattern in each set. The different write precompensation values result in a predetermined phase shift being inserted into test data that include the different NRZI data patterns selected from each set.

Test data is written 1301 to a recording medium of a storage device using the first and second NRZI data patterns at the first and second write precompensation values. The test data is used to determine 1302 response of the storage device to the predetermined phase shift. For example, a read channel can be tested on ability to adapt to the phase shift of a certain magnitude. The predetermine phase shifts can simulate phase shifts that may be induced during operation by a light source of a heat-assisted recording medium, e.g., laser mode hops.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
setting first and second different write precompensation values to be associated with different first and second non-return-to-zero, inverted (NRZI) data patterns, the first and second different write precompensation values causing a predetermined phase shift to be written into test data that comprises the first and second NRZI data patterns;
writing the test data to a recording medium of a storage device using the first and second write precompensation values; and
utilizing the test data to determine an ability to adapt to phase shifts induced by mode hops of a light source of a heat-assisted recording medium based on a response of the storage device to the predetermined phase shift.

2. The method of claim 1, wherein the first and second NRZI patterns are selected from a set of 16, three-bit-lookback, NRZI patterns.

3. The method of claim 2, wherein all of the NRZI patterns end on a transition.

4. The method of claim 1, wherein writing the test data comprises writing at least two consecutive segments that do not share any of the same NRZI patterns.

5. The method of claim 4, wherein the predetermined phase shift occurs at a boundary of the two consecutive segments.

6. The method of claim 1, wherein, during the writing of the first and second data segments, the first and second write precompensation values are combined with default precompensation values of the data storage device that are intended to compensate for systematically-induced phase shifts.

7. The method of claim 1, wherein determining the response of the storage device to the predetermined phase shift comprises testing a read channel response to the predetermined phase shift.

8. An apparatus comprising:
interface circuitry configured to write data to a magnetic recording medium via a write transducer and read from the magnetic recording medium via a read transducer; and
a controller coupled to the interface circuitry and configured to:
select first and second write precompensation values associated with respective different first and second non-return-to-zero, inverted (NRZI) data patterns;
write first and second data segments to the magnetic recording medium using the respective first and second write precompensation values combined with default precompensation values of the data storage device that are intended to compensate for systematically-induced phase shifts, the first and second data segments comprising the respective different first and second NRZI data patterns, the first and second write precompensation values causing the first and second data segments to be written with a predetermined phase shift therebetween; and
read the first and second data segments via the read transducer to test a response of the apparatus to the predetermined phase shift.

9. The apparatus of claim 8, wherein the first and second NRZI patterns are selected from a set of 16 three-bit-lookback NRZI patterns that all end on a transition.

10. The apparatus of claim 8, wherein the predetermined phase shift occurs at a boundary of the first and second data segments.

11. The apparatus of claim 8, wherein the apparatus comprises a heat-assisted recording medium storage device with a light source used to write data, and wherein characterizing the response of the storage device comprises determining an ability of the apparatus to adapt to phase shifts induced by mode hops of the light source.

12. The apparatus of claim 8, wherein determining the response of the apparatus to the predetermined phase shift comprises testing a read channel response to the predetermined phase shift.

13. A method comprising:
using a first write precompensation value to write a first set of non-return-to-zero, inverted (NRZI) data patterns to a recording medium of a data storage device;
using a different, second write precompensation value to write a second set of NRZI data patterns, the first set and the second sets having no NRZI data patterns in common;
writing test data that comprises patterns from the first and second sets using the respective first and second write precompensation values combined with default precompensation values of the data storage device that are intended to compensate for systematically-induced phase shifts; and
reading the test data to determine a response of the storage device to a predetermined phase shift induced by the first and second write precompensation values.

14. The method of claim 13, wherein members of the first and second sets are selected from a set of 16 three-bit-lookback NRZI patterns.

15. The method of claim 13, wherein the first and second sets are of equal size.

16. The method of claim 13, wherein determining the response of the storage device comprises determining an ability of a read channel to adapt to phase shifts induced by a light source of a heat-assisted recording medium storage device.

17. The method of claim 13, wherein all of the NRZ patterns of the first and second sets end on a transition.

18. The method of claim 13, wherein determining the response of the storage device to the predetermined phase shift comprises testing a read channel response to the predetermined phase shift.

* * * * *